(12) United States Patent
Mayfield, III et al.

(10) Patent No.: US 9,335,031 B2
(45) Date of Patent: May 10, 2016

(54) DOOR ASSEMBLY FOR A LIGHT FIXTURE HAVING A DIFFUSER AND REFRACTOR AND METHOD OF ASSEMBLING THE SAME

(71) Applicant: ABL IP HOLDING LLC, Conyers, GA (US)

(72) Inventors: John T. Mayfield, III, Loganville, GA (US); Russell Vern Rouse, Oxford, GA (US)

(73) Assignee: ABL IP Holding LLC, Decatur, GA (US)

( * ) Notice: Subject to any disclaimer, the term of this patent is extended or adjusted under 35 U.S.C. 154(b) by 372 days.

(21) Appl. No.: 13/788,530

(22) Filed: Mar. 7, 2013

(65) Prior Publication Data

US 2013/0294090 A1    Nov. 7, 2013

Related U.S. Application Data (60) Provisional application No. 61/687,880, filed on May 3, 2012.

(51) Int. Cl.

| | |
|---|---|
| *F21S 8/02* | (2006.01) |
| *F21V 15/01* | (2006.01) |
| *F21V 17/10* | (2006.01) |
| *F21V 17/00* | (2006.01) |
| *F21V 5/00* | (2015.01) |
| *B23P 11/00* | (2006.01) |

(Continued)

(52) U.S. Cl.
CPC ............... *F21V 17/00* (2013.01); *B23P 11/00* (2013.01); *F21V 5/00* (2013.01); *F21V 15/01* (2013.01); *F21V 17/10* (2013.01); *F21V 17/16* (2013.01); *F21V 17/164* (2013.01); *F21S 8/026* (2013.01); *F21V 3/0445* (2013.01); *F21V 5/02* (2013.01); *Y10T 29/49826* (2015.01)

(58) Field of Classification Search
CPC ............ A01G 7/045; F21S 8/02; F21S 8/026; F21S 8/04; F21V 15/01; F21V 15/012; F21V 17/00; F21V 17/005; F21V 17/164; F21V 15/008

See application file for complete search history.

(56) References Cited

U.S. PATENT DOCUMENTS

| | | | | |
|---|---|---|---|---|
| 3,004,148 | A | * 10/1961 | Rosolia | ............... F21S 8/02 362/319 |
| 3,934,135 | A | * 1/1976 | Szer | ............... F21V 17/164 362/330 |

(Continued)

OTHER PUBLICATIONS

Office Action for Canadian Application No. CA 2,809,528, mailed Apr. 30, 2014, 2 pages.

(Continued)

*Primary Examiner* — Anh Mai
*Assistant Examiner* — Steven Horikoshi
(74) *Attorney, Agent, or Firm* — Kilpatrick Townsend & Stockton, LLP (57) ABSTRACT

A door assembly for a lighting fixture. Embodiments of the door assembly include a door frame defined by two frame sides and two frame ends that define a frame opening. A diffuser panel is positioned within the door frame to span the frame opening and a refractor extends along the length of the door frame. The refractor is retained on the door assembly at its ends. More specifically, in some embodiments an aperture having the profile of the refractor is provided in the end plate on each frame end. The ends of the refractor are inserted into the apertures of the end plates to retain the refractor on the door assembly by its ends.

19 Claims, 6 Drawing Sheets

(51) Int. Cl.
*F21V 17/16* (2006.01)
*F21V 3/04* (2006.01)
*F21V 5/02* (2006.01)

(56) References Cited

U.S. PATENT DOCUMENTS

| | | | |
|---|---|---|---|
| 5,988,829 A * | 11/1999 | Holder | F21S 8/02 362/147 |
| 8,556,453 B1 * | 10/2013 | Crane et al. | 362/217.11 |
| 2004/0012981 A1 * | 1/2004 | Sejkora | E04B 9/26 362/560 |
| 2005/0281023 A1 * | 12/2005 | Gould et al. | 362/217 |
| 2008/0094535 A1 * | 4/2008 | Suh et al. | 349/58 |
| 2010/0053947 A1 * | 3/2010 | Fowler, Jr. | F21V 3/04 362/223 |
| 2011/0044024 A1 * | 2/2011 | Kim | F21S 8/026 362/84 |
| 2012/0120645 A1 * | 5/2012 | Hawkins et al. | 362/225 |

OTHER PUBLICATIONS

Notice of Allowance for Canadian Application No. CA 2,809,528, mailed Oct. 21, 2014, 1 Page.

* cited by examiner

DOOR ASSEMBLY FOR A LIGHT FIXTURE HAVING A DIFFUSER AND REFRACTOR AND METHOD OF ASSEMBLING THE SAME

CROSS-REFERENCE TO RELATED APPLICATIONS

This application claims the benefit of U.S. Provisional Application No. 61/687,880, filed May 3, 2012, the entirety of which is herein incorporated by reference.

FIELD

Embodiments of the present invention relate to a door assembly for a lighting fixture, such as a recessed lighting fixture.

BACKGROUND

Traditional door assemblies have a central refractor flanked by separate and discrete diffuser panels. Metal frames extend down the middle of the door assembly along the length of the door assembly. The refractor is typically fastened to these metal frames or snap-fitted over the metal frames to retain the refractor on the door assembly. The frames are visible and appear as dark lines extending down the length of the fixture, thereby detracting from the appearance of the fixture. Another typical door assembly technique substitutes the central metal frame members with translucent plastic frame members. This detracts from the appearance as well, because this technique also creates dark areas that extend down the length of the fixture.

SUMMARY

Certain embodiments of the present invention provide a door assembly for a lighting fixture. Embodiments of the door assembly include a door frame defined by two frame sides and two frame ends that define a frame opening. A diffuser panel is positioned within the door frame to span the frame opening and a refractor extends along the length of the door frame. The refractor is retained on the door assembly at its ends. More specifically, in some embodiments an aperture having the profile of the refractor is provided in the end plate on each frame end. The ends of the refractor are inserted into the apertures of the end plates to retain the refractor on the door assembly by its ends.

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

BRIEF DESCRIPTION OF THE FIGURES

Illustrative embodiments of the present invention are described in detail below with reference to the following drawing figures.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
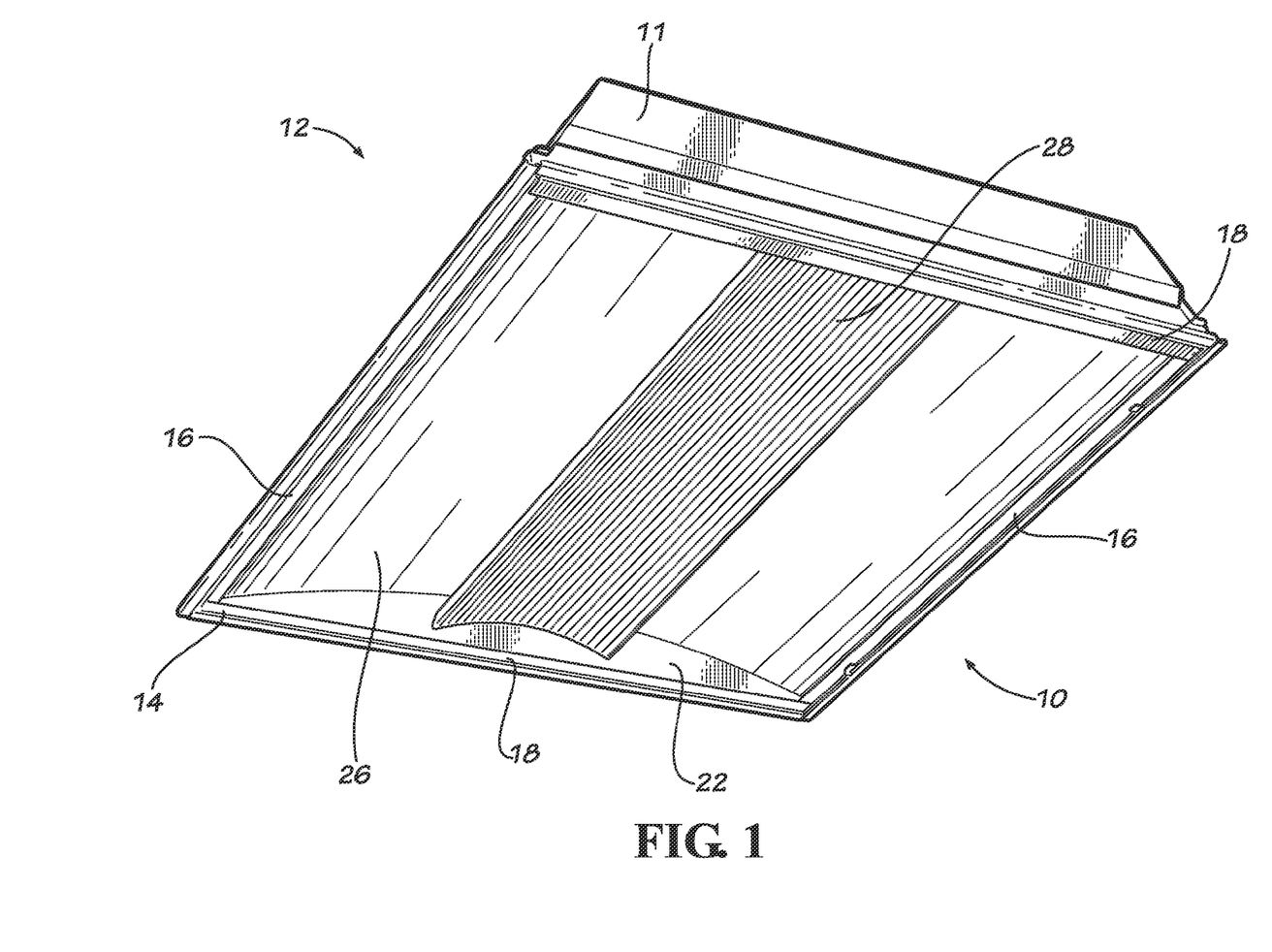
FIG. 1 is a bottom perspective view of an embodiment of a light fixture having an embodiment of a door assembly disclosed herein.
Figure 2:
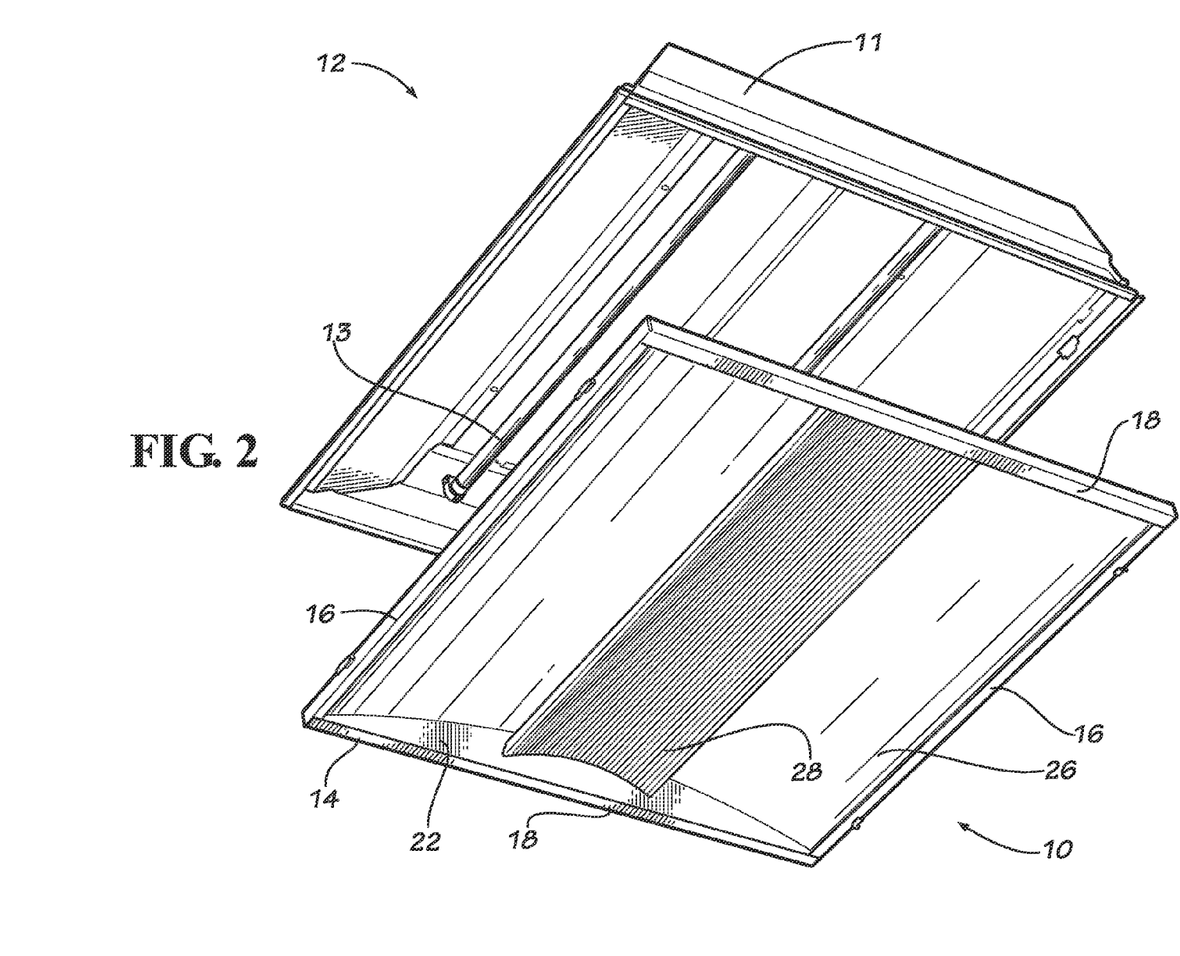
FIG. 2 is an exploded view of the light fixture of FIG. 1.
Figure 3:
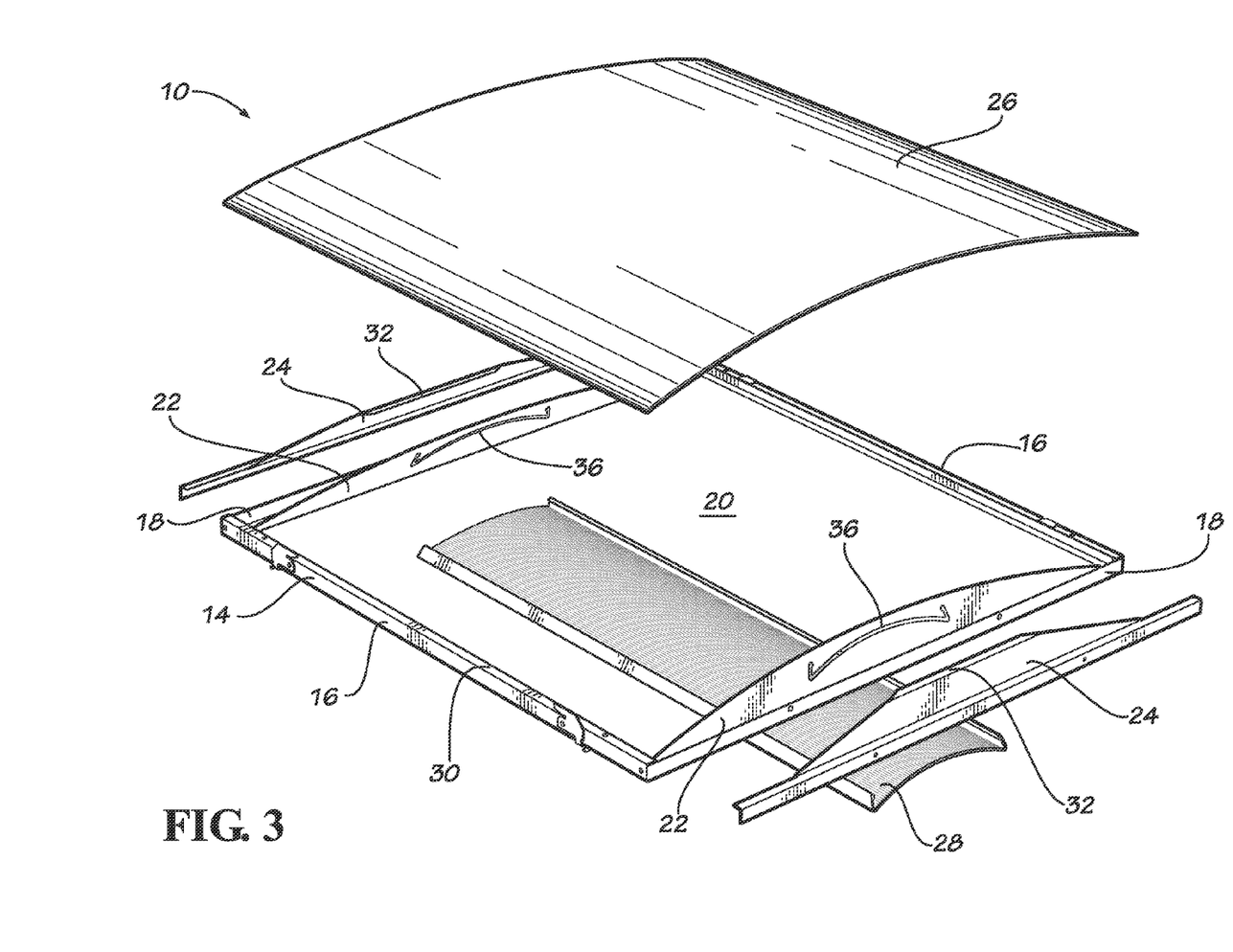
FIG. 3 is an exploded view of an embodiment of a door assembly.

Embodiments of the present invention relate to a door assembly 10 for a lighting fixture 12, such as a recessed lighting fixture. The lighting fixture 12 typically will include a housing 11 that houses any type of light source 13, including, but not limited to fluorescent or LED light sources. Embodiments of the door assembly are retained on the housing 11. FIGS. 1 and 2 show an embodiment of a door assembly 10 secured to and exploded from a housing 11 of a recessed lighting fixture 12, respectively. FIG. 3 shows an exploded view of the embodiment of the door assembly 10 shown in FIGS. 1 and 2.

Figure 4:
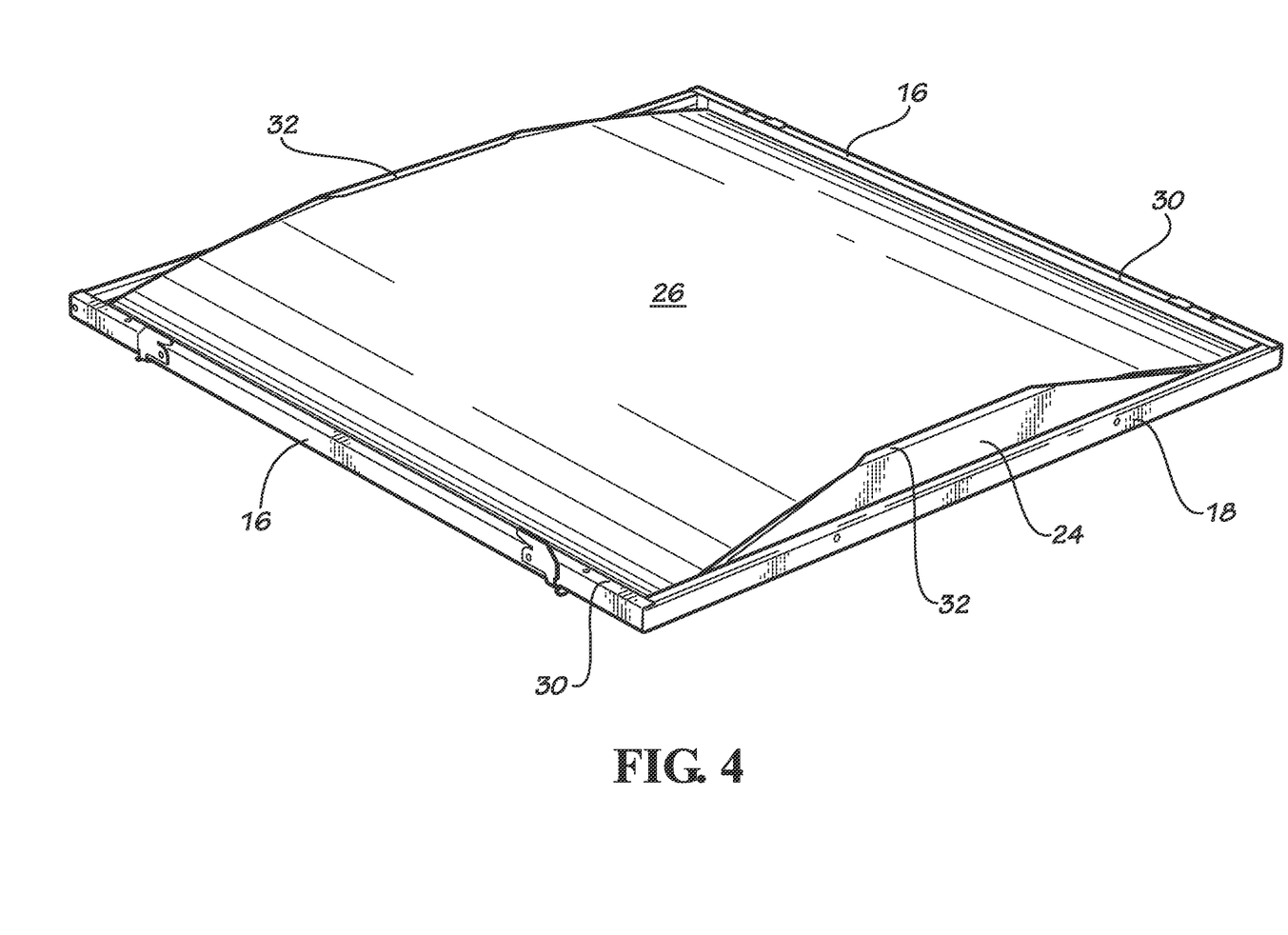
FIG. 4 is a top perspective view of a diffuser retained within the door frame of a door assembly according to an embodiment of the invention.

The door assembly 10 includes a door frame 14 defined by two frame sides 16 and two frame ends 18 that define a frame opening 20. The door frame 14 can be of any dimension (e.g., 1'×4', 2'×4', 2'×2', etc.) and is not limited to the version shown in the figures. An end plate 22 extends upwardly on each frame end 18 of the door frame 14. A bracket 24 is mounted adjacent each frame end 18. A bracket 24 may be mounted on the outside of each frame end 18 or alternatively may be positioned between each end plate 22 and frame end 18. Either way, a bracket 24 is preferably adjacent each end plate 22. A diffuser panel 26 is positioned within the door frame 14 to span the frame opening 20 (see FIG. 4) and a refractor 28 extends along the length of the door frame 14. While a single, centrally located refractor 28 is shown in the figures, more than one refractor may be retained at any location across the width of the door frame 14 using the retention methods disclosed herein.

Figure 5:
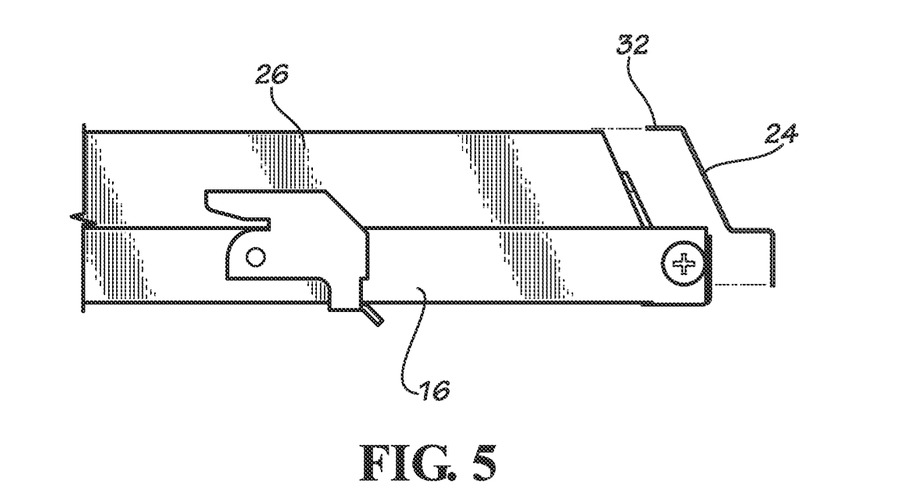
FIG. 5 is a partial exploded view showing an embodiment of a bracket exploded from an end of an embodiment of a door frame.
Figure 6:
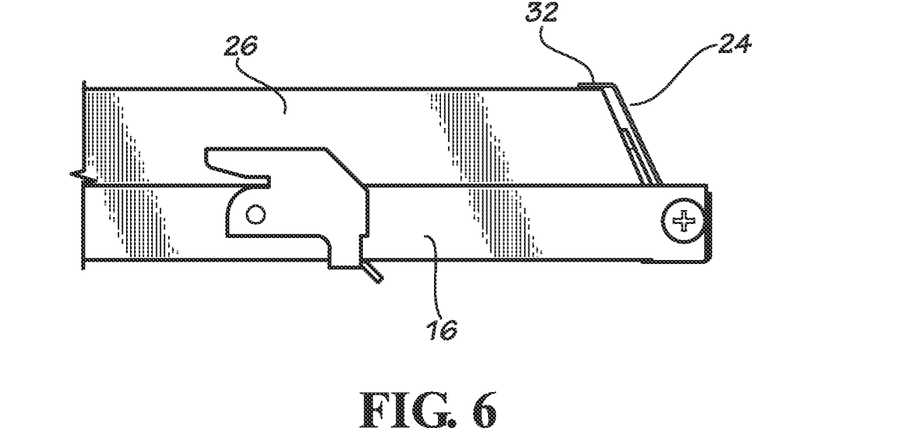
FIG. 6 is a partial elevation view of the bracket of FIG. 5 mounted on the end of the door frame.
Figure 8:
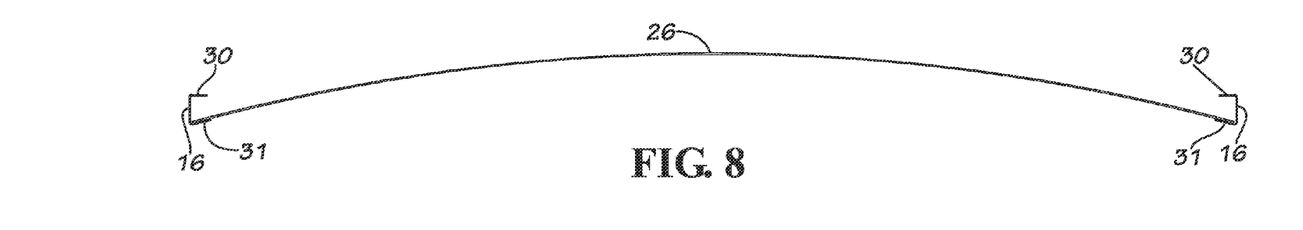
FIG. 8 is a cross-sectional view of a diffuser positioned between the frame sides of an embodiment of a door assembly.

In some embodiments, the width of the diffuser panel 26 in its relaxed state is larger than the width of the frame opening 20. To position the diffuser panel 26 within the door frame 14, the diffuser panel 26 is deformed (such as by bending or bowing the panel) and captured between the frame sides 16 of the door frame 14. In some embodiments, the frame sides 16 are "C" shaped so as to have an upper flange 30 and a lower ledge 31, as seen in FIG. 8. The lower ledges 31 helps retain the diffuser panel 26 within the door frame 14 by preventing downward movement of the diffuser panel 26. The upper flanges 30 on the frame sides 16 prevent upwardly movement of the diffuser panel 26 within the door frame 14. Moreover, the brackets 24 may also be provided with an upper flange 32. When positioned on a frame end 18, the upper flange 32 of the bracket 24 abuts the top of the diffuser panel 26, thereby helping to retain the panel 26 in place within the door frame 14 as well (see FIGS. 4-6).

Figure 7:
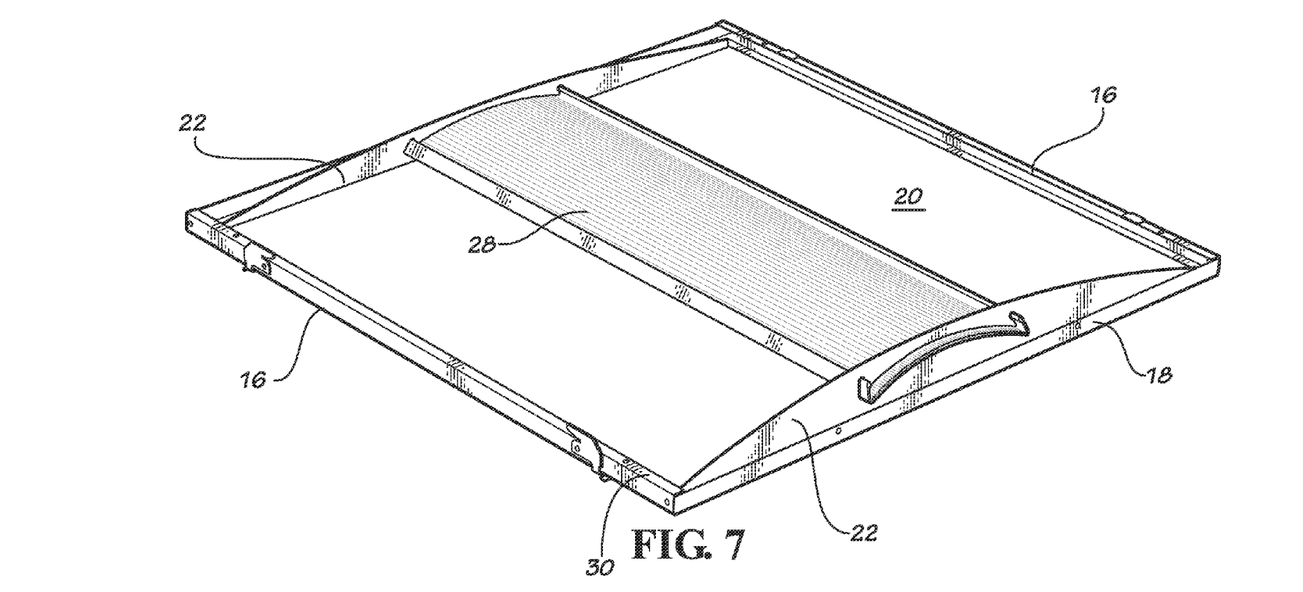
FIG. 7 is a top perspective view of a door assembly according to an embodiment of the invention.

The refractor 28 is retained on the door assembly 10 at its ends. More specifically, an aperture 36 having the profile of the refractor 28 is provided in the end plate 22 on each frame end 18 of the door frame 14. The ends of the refractor 28 are inserted into the apertures 36 of the end plates 22 to suspend the refractor 28 in the door assembly 14 by its ends. See FIG. 7. The brackets 24 positioned adjacent the end plates 22 on the frame ends 18 help restrict longitudinal movement of the refractor 28 within the apertures 36 and relative to the end plates 22.

The diffuser panel 26 may be formed from any polymeric material that permits light from the light sources to pass through the material while at the same time obscuring visibility of the light sources located behind the diffuser panel. By way only of example, frosted acrylic or polycarbonate may be suitable. The refractor 28 can also be formed of any translucent polymeric material. The refractor 28 may be plain or prismatic. Decorative design(s) may also be provided on the refractor 28. Moreover, the refractor 28 can be provided in any color.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

We claim:

1. A door assembly for a light fixture comprising:
   a. a first frame side and a second frame side opposite the first frame side, wherein the first frame side and the second frame side are separated by a width;
   b. a first frame end and a second frame end opposite the first frame end, wherein the first frame end and the second frame end are separated by a length, wherein each of the first frame end and the second frame end is connected to and spans the width between the first frame side and the second frame side to define a frame opening;
   c. a first end plate having a thickness and extending upwardly from the first frame end and a second end plate having a thickness and extending upwardly from the second frame end, wherein an aperture having a substantially arcuate profile is defined in, and extends through the thicknesses of, each of the first and second end plates;
   d. a translucent diffuser panel retained within the frame opening, wherein the translucent diffuser panel spans the length and the width, and is curved in a downwardly concave shape from the first frame side to the second frame side, but is not curved from the first frame end to the second frame end; and
   e. a refractor comprising a first end and a second end each having a profile substantially the same as the aperture profile in the first and second end plates, wherein the refractor is retained in the door frame solely by engagement of the first end of the refractor in the aperture on the first end plate and the second end of the refractor in the aperture on the second end plate,
   wherein, when the door assembly is viewed from below, a first portion of the diffuser panel extends between the refractor and the first frame side and a second portion of the diffuser panel extends between the refractor and the second frame side.

2. The door assembly of claim 1, wherein each of the first and second frame sides comprises an upper flange that extends toward the frame opening above an edge of the diffuser panel.

3. The door assembly of claim 1, wherein each of the first and second frame sides comprises a lower ledge upon which an edge of the diffuser panel rests.

4. The door assembly of claim 1, wherein the diffuser panel comprises a width greater than the width between the first frame side and the second frame side.

5. The door assembly of claim 1, further comprising a first bracket positioned adjacent the first end plate and a second bracket positioned adjacent the second end plate to limit movement of the refractor relative to the first and second end plates.

6. The door assembly of claim 5, wherein each of the first and second brackets comprises an upper flange that extends toward the frame opening above an edge of the diffuser panel.

7. The door assembly of claim 1, wherein the door assembly is retained on a housing of the light fixture.

8. The door assembly of claim 1, wherein the translucent diffuser panel comprises a polymeric material that allows light from the light fixture to pass through the diffuser while obscuring visibility of light sources in the light fixture.

9. The door assembly of claim 1, wherein the refractor has a downwardly concave, curved profile in a direction of the width but is not curved in a direction of the length, and wherein the curved profile matches the substantially arcuate profiles of the apertures defined in each of the first and second end plates.

10. A method of assembling a door assembly comprising:
    a. providing a door frame comprising:
       a first frame side and a second frame side opposite the first frame side, wherein the first frame side and the second frame side are separated by a width;
       a first frame end and a second frame end opposite the first frame end, wherein the first frame end and the second frame end are separated by a length, wherein each of the first frame end and the second frame end is connected to and spans the width between the first frame side and the second frame side to define a frame opening; and
       a first end plate having a thickness and extending upwardly from the first frame end and a second end plate having a thickness and extending upwardly from the second frame end, wherein an aperture having a substantially arcuate profile is defined in, and extends through the thicknesses of, each of the first and second end plates;

b. providing a translucent diffuser panel having a length substantially equal to the length between the first frame end and the second frame end, and a width greater than the width between the first frame side and the second frame side;

c. positioning the diffuser panel in the frame so that the diffuser panel forms a downwardly concave shape along a direction of the width between the first frame side and the second frame side, and so that the diffuser panel spans the frame opening;

d. positioning a first end of a refractor in the aperture of the first end plate and positioning a second end of the refractor in the aperture of the second end plate so that the refractor is retained in the door frame solely by engagement of the first end of the refractor in the aperture of the first end plate and the second end of the refractor in the aperture of the second end plate and so that, when the door assembly is viewed from below, a first portion of the diffuser panel extends between the refractor and the first frame side and a second portion of the diffuser panel extends between the refractor and the second frame side.

11. The method of claim 10, wherein positioning the diffuser panel in the frame comprises bending the diffuser panel to form the downwardly concave shape.

12. The method of claim 10, wherein positioning the diffuser panel in the frame comprises positioning an edge of the diffuser panel to rest on a lower ledge of the first frame side and the second frame side.

13. The method of claim 10, further comprising mounting a first bracket adjacent the first end plate and a second bracket adjacent the second end plate to limit movement of the refractor relative to the first and second end plates.

14. The method of claim 10, wherein positioning the diffuser panel in the frame such that the diffuser panel spans the frame opening comprises positioning the diffuser panel in the frame such that the diffuser panel spans the entirety of the frame opening.

15. The method of claim 10, wherein providing the translucent diffuser panel comprises providing the diffuser panel of a polymeric material that permits light to pass through the material, while obscuring visibility of light sources providing the light.

16. The method of claim 10, wherein positioning the first end and the second end of the refractor includes providing the refractor with a downwardly concave profile, in a direction of the width, that matches the substantially arcuate profiles of the apertures defined in each of the first and second end plates.

17. A door assembly for a light fixture comprising:

a. a first frame side and a second frame side opposite the first frame side, wherein the first frame side and the second frame side are separated by a width;

b. a first frame end and a second frame end opposite the first frame end, wherein the first frame end and the second frame end are separated by a length, wherein each of the first frame end and the second frame end is connected to and spans the width between the first frame side and the second frame side to define a frame opening;

c. a first end plate having a thickness and extending upwardly from the first frame end and a second end plate having a thickness and extending upwardly from the second frame end, wherein an aperture having a substantially arcuate profile is defined in, and extends entirely through the thicknesses of, each of the first and second end plates;

d. a translucent diffuser panel retained within the frame opening, wherein the diffuser panel comprises a width greater than the width between the first frame side and the second frame side and wherein the diffuser panel is curved to form a downwardly concave shape within, and spans the entirety of, the frame opening;

e. a refractor comprising a first end and a second end and having a profile substantially the same as the substantially arcuate aperture profile in the first and second end plates, wherein the refractor is retained in the door frame solely by engagement of the first end of the refractor in the aperture on the first end plate and the second end of the refractor in the aperture on the second end plate; and f. a first bracket positioned adjacent the first end plate and a second bracket positioned adjacent the second end plate to limit movement of the refractor relative to the first and second end plates, wherein, when the door assembly is viewed from below, a first portion of the diffuser panel extends between the refractor and the first frame side and a second portion of the diffuser panel extends between the refractor and the second frame side.

18. The door assembly of claim 17, wherein the translucent diffuser panel comprises a polymeric material that allows light from the light fixture to pass through the diffuser while obscuring visibility of light sources in the light fixture.

19. The door assembly of claim 17, wherein the refractor has a downwardly concave, curved profile in a direction of the width but is not curved in a direction of the length, and wherein the curved profile matches the substantially arcuate profiles of the apertures defined in each of the first and second end plates.

* * * * *